(12) United States Patent
Kim (10) Patent No.: US 12,308,454 B2
(45) Date of Patent: May 20, 2025

(54) BATTERY PACK (71) Applicant: SAMSUNG SDI CO., LTD., Yongin-si (KR)

(72) Inventor: Myungchul Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 650 days.

(21) Appl. No.: 17/621,289

(22) PCT Filed: Jun. 18, 2020

(86) PCT No.: PCT/KR2020/007893
§ 371 (c)(1),
(2) Date: Dec. 21, 2021

(87) PCT Pub. No.: WO2020/256428
PCT Pub. Date: Dec. 24, 2020

(65) Prior Publication Data
US 2022/0223961 A1    Jul. 14, 2022

(30) Foreign Application Priority Data

Jun. 21, 2019  (KR) .................. 10-2019-0074124

(51) Int. Cl.
*H01M 50/24* (2021.01)
*H01M 50/209* (2021.01)
*H01M 50/595* (2021.01)

(52) U.S. Cl.
CPC ......... *H01M 50/24* (2021.01); *H01M 50/209* (2021.01); *H01M 50/595* (2021.01)

(58) Field of Classification Search
CPC .... H01M 50/24; H01M 50/209; H01M 50/30; H01M 50/21
See application file for complete search history.

(56) References Cited

U.S. PATENT DOCUMENTS 7,749,648 B2   7/2010  Kim
9,673,489 B2   6/2017  Lee et al.
(Continued)

FOREIGN PATENT DOCUMENTS

CN    101317285 A    12/2008
CN    103844552 A    6/2014
(Continued)

OTHER PUBLICATIONS

Machine Translation of: CN 103844552 A, Zhang, Jun. 11, 2014.*
(Continued)

*Primary Examiner* — Kenneth J Douyette
(74) *Attorney, Agent, or Firm* — Lee IP Law, P.C.

(57) ABSTRACT

In the present disclosure, a battery pack is disclosed. The battery pack includes a plurality of battery cells, and an insulating adhesive tape interposed between the battery cells adjacent to each other, wherein the insulating adhesive tape includes an insulating film, and a double-sided adhesive film attached onto the insulating film and including a plurality of cut lines along a length direction.

According to the present disclosure, there can be provided a battery pack in which driving stability is improved, weight reduction is advantageous, and the structure of the insulating adhesive tape interposed between adjacent battery cells is improved, thereby preventing defects caused when the insulating adhesive tape is cut or attached.

18 Claims, 6 Drawing Sheets

(56) References Cited

U.S. PATENT DOCUMENTS

| | | | |
|---|---|---|---|
| 11,038,226 B2 | 6/2021 | Lee et al. | |
| 2006/0257726 A1* | 11/2006 | Kelley | H01M 50/00 |
| | | | 429/185 |
| 2007/0264535 A1 | 11/2007 | Lee et al. | |
| 2010/0212817 A1* | 8/2010 | Nagare | H01M 4/08 |
| | | | 156/443 |
| 2011/0129728 A1 | 6/2011 | Kim et al. | |
| 2014/0220415 A1 | 8/2014 | Lim | |
| 2017/0037283 A1 | 2/2017 | Yamamoto et al. | |
| 2019/0020079 A1 | 1/2019 | Lee et al. | |

FOREIGN PATENT DOCUMENTS

| | | | |
|---|---|---|---|
| CN | 106450406 A | 2/2017 | |
| CN | 206490118 U | 9/2017 | |
| CN | 109216594 A | 1/2019 | |
| CN | 109273803 A | 1/2019 | |
| CN | 109904353 A | 6/2019 | |
| DE | 102012211653 A1 | 5/2014 | |
| JP | 1997-501901 A | 2/1997 | |
| JP | 2005-085570 A | 3/2005 | |
| JP | 2015-048430 A | 3/2015 | |
| JP | 2015-201373 A | 11/2015 | |
| JP | 6093460 B | 2/2017 | |
| KR | 10-0571269 B1 | 4/2006 | |
| KR | 10-2011-0060167 A | 6/2011 | |
| KR | 10-2014-0090336 A | 7/2014 | |
| KR | 10-2015-0057887 A | 5/2015 | |
| KR | 10-2019-0008728 A | 1/2019 | |

OTHER PUBLICATIONS

Chinese Notice of Allowance dated Aug. 15, 2023, of the corresponding CN Patent Application No. 202080045382.3.

Chinese Office Action issued Feb. 23, 2023 for corresponding CN Patent Application No. 202080045382.3.

International Search Report dated Sep. 28, 2020 for PCT/KR2020/007893.

European Office Action mailed May 17, 2024, for corresponding EP Patent Application No. 20825551.3.

\* cited by examiner

BATTERY PACK

CROSS REFERENCE TO RELATED APPLICATIONS

This is the U.S. national phase application of PCT Application No. PCT/KR2020/007893 filed Jun. 18, 2020, which is claims priority from Korean Patent Application No. 10-2019-0074124 filed on Jun. 21, 2019, the entire contents of all of which are hereby incorporated by reference.

TECHNICAL FIELD

The present disclosure relates to a battery pack.

BACKGROUND ART

In general, a secondary battery is a battery that can be charged and discharged, unlike a primary battery that cannot be charged. Secondary batteries are used as energy sources for mobile devices, electric vehicles, hybrid vehicles, electric bicycles, uninterruptible power supply, and the like. The secondary batteries may be used in the form of a single battery depending on the type of external device to be applied, or may be used in the form of a module in which a plurality of batteries are connected and bundled as a unit.

Small mobile appliances such as cell phones can be operated for a certain period of time with the power and capacity of a single battery. However, In the case of appliances that require long-term driving and high-power driving, such as electric vehicles and hybrid vehicles that consume a lot of power, due to the problem of power and capacity, a module type battery including a plurality of batteries is preferred, and an output voltage or an output current can be increased according to the number of built-in batteries.

DESCRIPTION OF EMBODIMENTS

Technical Problem

An embodiment of the present disclosure provides a battery pack having improved driving stability and advantageous in light reduction.

An embodiment of the present disclosure provides a battery pack in which the structure of an insulating adhesive tape interposed between adjacent battery cells is improved, thereby preventing defects caused when the insulating adhesive tape is cut or attached.

Solution to Problem

In order to solve the above problems, a battery back of the present disclosure includes
a plurality of battery cells; and
an insulating adhesive tape interposed between the battery cells adjacent to each other;
wherein the insulating adhesive tape includes
an insulating film; and
at least one double-sided adhesive film attached between the insulating film and the battery cell and extending along one direction,
wherein a plurality of cut lines are formed in the double-sided adhesive film.

Advantageous Effects of Disclosure

According to the present disclosure, there can be provided a battery pack in which adjacent battery cells are insulated from each other and structurally bonded to each other, thereby improving driving stability and enabling weigh reduction, and can be provided a battery pack in which cutting defects caused in the process of individually cutting a continuously supplied insulating adhesive tape can be prevented, a work for attaching the insulating adhesive tape can be easily performed by preventing the crumples or wrinkles of the insulating adhesive tape, and adhesion force between battery cells can be maintained firmly.

BEST MODE

A battery back of the present disclosure includes
a plurality of battery cells; and
an insulating adhesive tape interposed between the battery cells adjacent to each other;
wherein the insulating adhesive tape includes
an insulating film; and
at least one double-sided adhesive film attached between the insulating film and the battery cell and extending along one direction,
wherein a plurality of cut lines are formed in the double-sided adhesive film.

For example, the cut lines may be formed on a straight line extending obliquely along an oblique direction with respect to a width direction of the double-sided adhesive film.

For example, the cut lines may extend at a constant inclination angle with respect to a width direction of the double-sided adhesive film.

For example, the cut lines may be formed at a regular pitch interval along a length direction of the double-sided adhesive film.

For example, the pitch interval may be set in a range of 20 mm to 30 mm.

For example, a shortest distance between the cut lines adjacent to each other in a length direction of the double-sided adhesive film may have a value greater than at least 0.

For example, the shortest distance between the cut lines adjacent to each other may be set in a range of 10 mm to 15 mm.

For example, the cut line may include first and second ends opposite to each other along a width direction of the double-sided adhesive film, and
the shortest distance between the cut lines adjacent to each other may correspond to a distance between the first and second ends opposite to each other.

For example, the cut line may be formed at a regular pitch interval along the length direction of the double-sided adhesive film, and the shortest distance between the cut lines adjacent to each other may be formed to be a half of the pitch interval.

For example, the cut line may include first and second ends opposite to each other along a width direction of the double-sided adhesive film, and the pitch interval may correspond to a distance between the same first ends or second ends of the cut lines adjacent to each other.

For example, the cut line may be limitedly formed over a cut thickness corresponding to a part of a total thickness of the double-sided adhesive film.

For example, an attachment area of the double-sided adhesive film attached to the insulating film may be smaller than an area of the insulating film.

For example, the double-sided adhesive film may be formed in a stripe pattern extending along one direction crossing the insulating film.

For example, the double-sided adhesive film may extend along a height direction of the battery cell.

For example, the double-sided adhesive film may be formed in pairs spaced apart from each other along a width direction of the battery cell.

For example, along an arrangement direction of the battery cells, the double-sided adhesive film may be attached to front and back surfaces of the insulating film, respectively.

MODE OF DISCLOSURE

Hereinafter, a battery pack according to a preferred embodiment of the present disclosure will be described with reference to the accompanying drawings.

Figure 1:
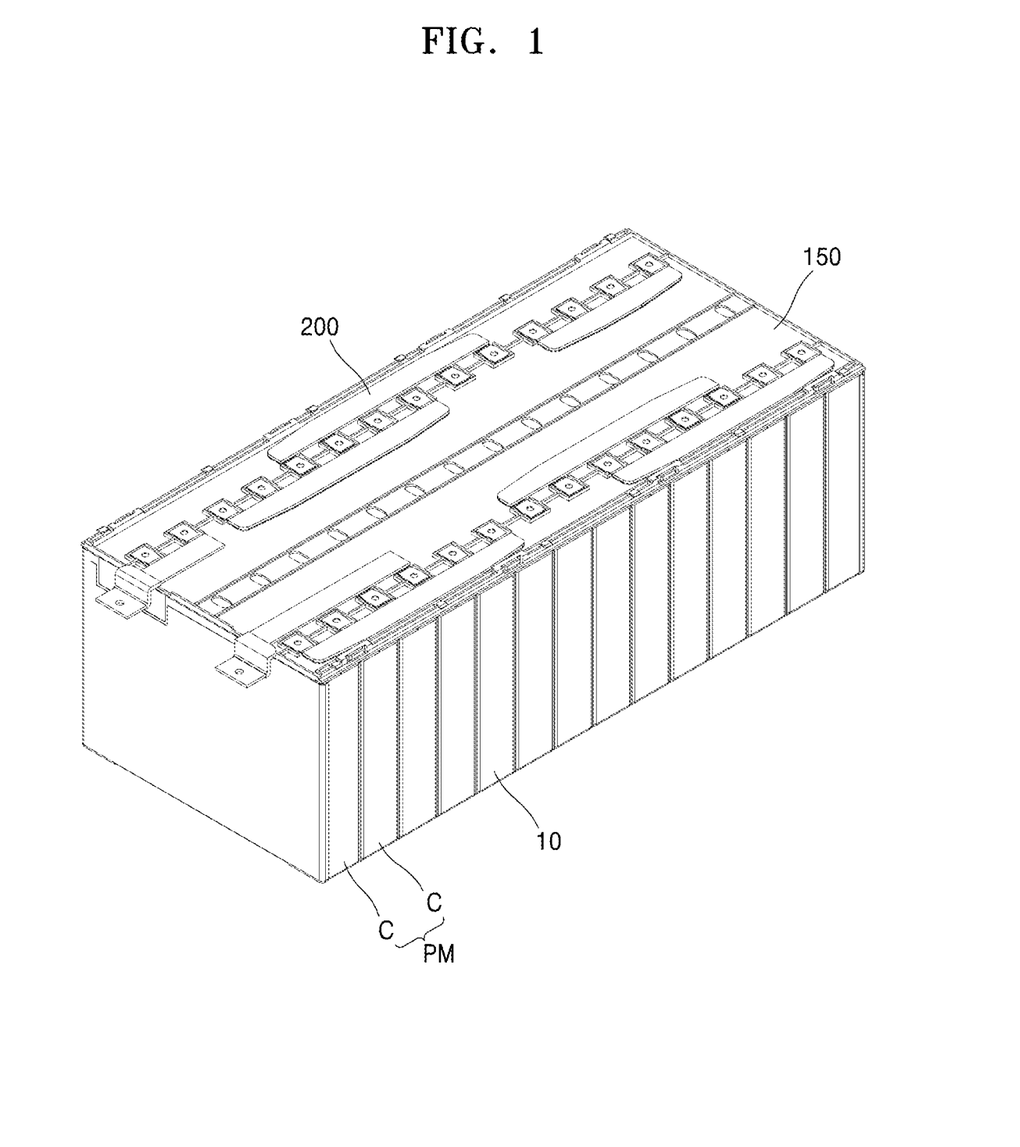
FIG. 1 shows a perspective view of a battery pack according to an embodiment of the present disclosure.
Figure 2:
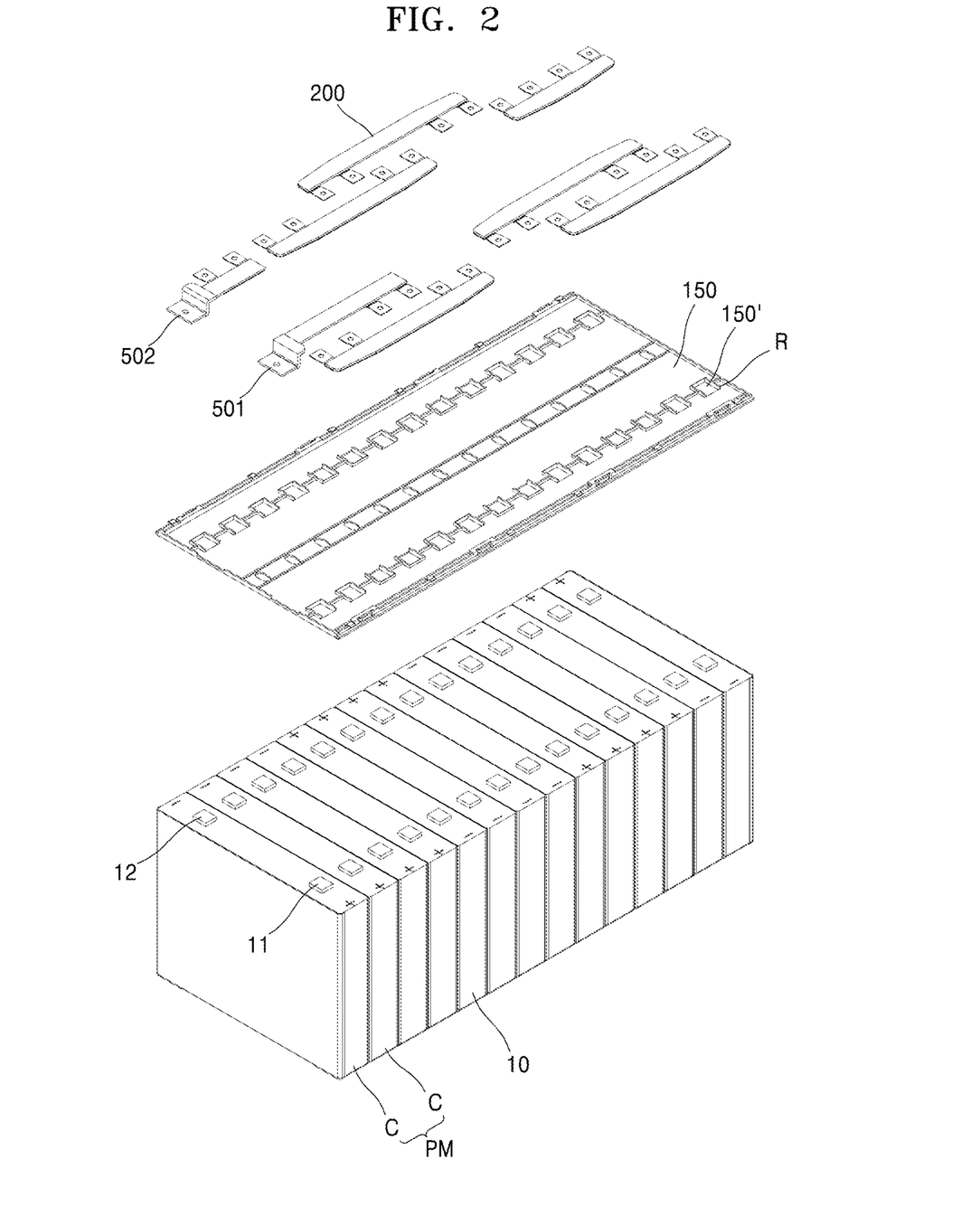
FIG. 2 shows an exploded perspective view of the battery pack shown in FIG. 1.

FIG. 1 shows a perspective view of a battery pack according to an embodiment of the present disclosure. FIG. 2 shows an exploded perspective view of the battery pack shown in FIG. 1.

Referring to FIGS. 1 and 2, the battery pack may include a plurality of battery cells C, a bus bar 200 for electrically connecting the plurality of battery cells C, and a bus bar holder 150 for providing electrical insulation between the bus bar 200 and the battery cells C.

The battery cell (C) may include an electrode assembly (not shown) and a case 10 for accommodating the electrode assembly (not shown), and first and second electrode terminals 11 and 12 electrically connected to different electrode plates of an electrode assembly (not shown) may be formed on the case 10. The first and second electrode terminals 11 and 12 may be assembled on the case 10, and any one of the first and second electrode terminals 11 and 12, for example, the first electrode terminal 11 may form a conductive connection with the case 10 and may have the same polarity as the case 10. In this case, the first electrode terminal 11 may be omitted, and the case 10 may serve as the first electrode terminal 11. Meanwhile, the second electrode terminal 12 may form an insulating connection with the case 10.

The bus bar 200 may connect a pair of adjacent battery cells C in parallel with the same polarity, and may connect a pair of adjacent battery cells C in parallel with each other to form a parallel module PM. The bus bar 200 may connect a pair of parallelly connected battery cells C (parallel module PM) and another pair of parallelly connected battery cells C (another parallel module PM) in series with opposite polarities. The bus bar 200 may electrically connect a pair of parallelly connected battery cells C (parallel module PM) and another pair of parallelly connected battery cells C (another parallel module PM) in series, but a pair of battery cells C (parallel module PM) and another pair of battery cells C (another parallel module PM), which are connected by the bus bar 200, may not be adjacent to each other. As such, first and second output terminals 501 and 502 of the battery pack may be concentrated at any one side of the battery pack through a manner in which the bus bar 200 connects non-adjacent battery cells C, that is, non-adjacent parallel modules PM in series.

The bus bar holder 150 may provide insulation between the battery cell C and the bus bar 200, and may include a terminal hole 150' for allowing coupling between the first and second electrode terminals 11 and 12 formed in the battery cell C and the bus bar 200. A positioning rib R for aligning the assembly position of the bus bar 200 may be formed around the terminal hole 150' of the bus bar holder 150.

Figure 3:
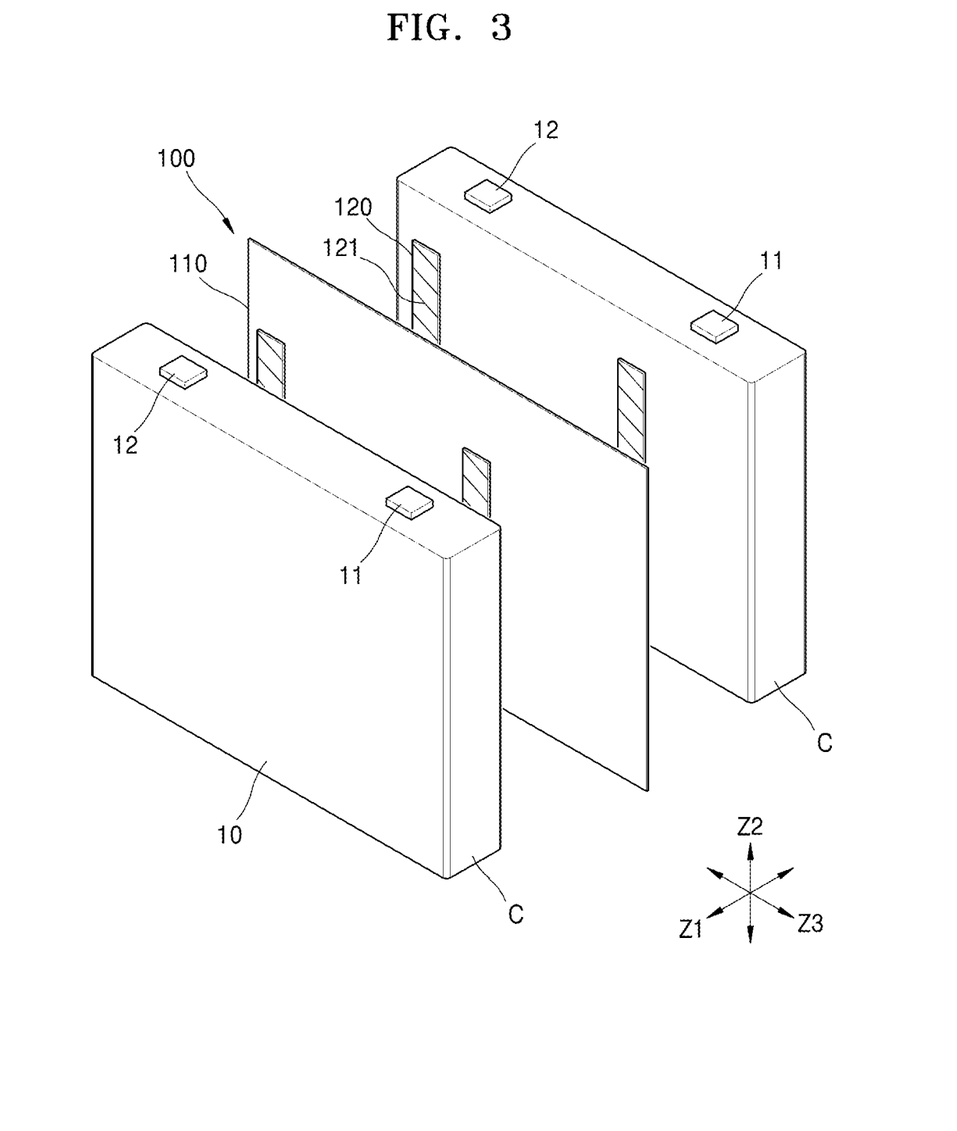
FIG. 3 shows an exploded perspective view of a part of the battery pack shown in FIG. 2.
Figure 4:
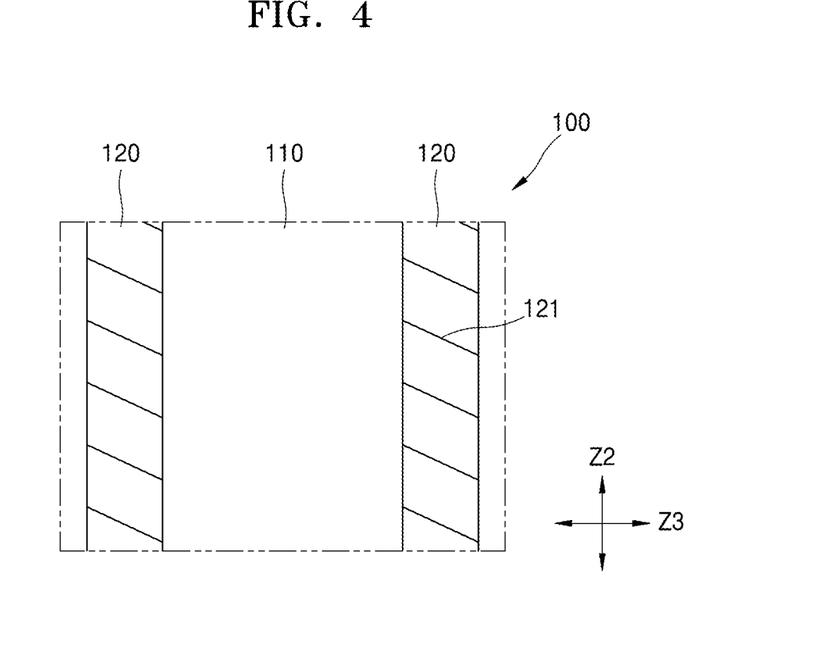
FIGS. 4 and 5 show a planar structure and a cross-sectional structure of the insulating adhesive tape shown in FIG. 3, respectively.
Figure 5:
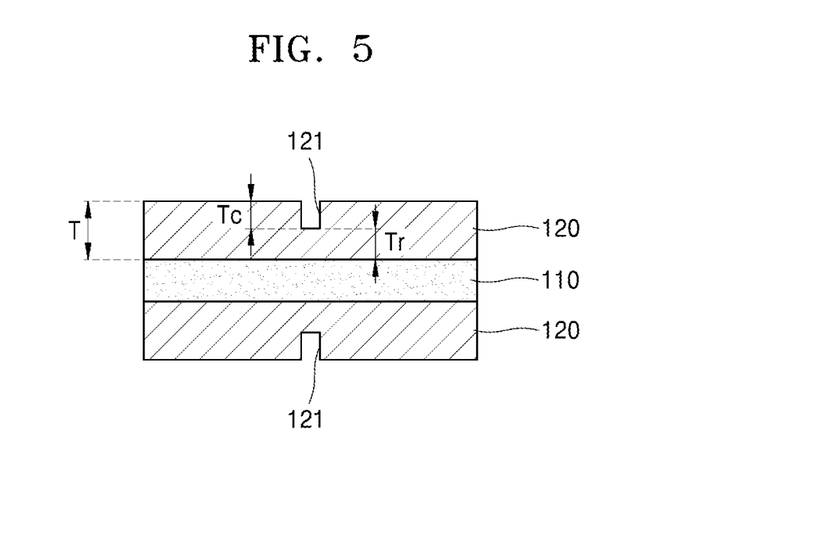

FIG. 3 shows an exploded perspective view of a part of the battery pack shown in FIG. 2. FIGS. 4 and 5 show a planar structure and a cross-sectional structure of the insulating adhesive tape shown in FIG. 3, respectively.

Referring to FIG. 3, referring to FIG. 3, an insulating adhesive tape 100 may be interposed between a plurality of battery cells C arranged in a row. The insulating adhesive tape 100 may serve to block the electrical interference and thermal interference between adjacent battery cells C. For example, the case 10 of the battery cell C may have an electrical polarity, and may have the same polarity as one electrode plate of an electrode assembly (not shown). In this case, the insulating adhesive tape 100 may be interposed between the neighboring battery cells C to block electrical interference therebetween.

The insulating adhesive tape 100 may structurally couple adjacent battery cells C to each other and bind a plurality of battery cells C to form a single pack. For example, in an embodiment of the present disclosure, the plurality of battery cells C for forming a battery pack may be coupled to each other through the insulating adhesive tape 100, and a separate binding structure for binding the plurality of battery cells C may be omitted. That is, as a binding structure for combining the plurality of battery cells C into one pack, a plurality of metal plates surrounding a row of battery cells C, for example, an end plate (not shown) and a side plate (not shown) need not be applied, and thus these metal plates may be omitted. As such, a low-weight battery pack may be provided by binding the plurality of battery cells C in the form of one pack through the insulating adhesive tape 100, and the volume and weigh of the battery pack may be reduced by omitting the binding structure made of a metal material.

The insulating adhesive tape 100 is interposed between adjacent battery cells C, and may be disposed in a central region of the battery cells C. The battery cell C may experience swelling in which volume expands according to charging and discharging operations, and in this case, swelling may be concentrated in the central region of the battery cell C rather than the edge of the battery cell C where the bending or warping of the case 10, which may limit the swelling, is formed. In this case, the insulating adhesive tape 100 may be placed in the central region of the battery cell C, thereby blocking electrical interference and thermal interference between adjacent battery cells C that may be deformed in a direction approaching each other according to swelling. In an embodiment of the present disclosure, the insulating adhesive tape 100 may be placed over most of the region of the battery cell C, including the central region of the battery cell C.

The insulating adhesive tape 100 may include an insulating film 110 and a double-sided adhesive film 120 attached to the insulating film 110. The insulating film 110 may be made of an insulating material to provide electrical insulation and thermal insulation between adjacent battery cells C, and may be formed in a size sufficient to cover most of the region of the battery cell C, including the central region of the battery cell C. For example, the insulating film 110 may be formed in the shape of a rectangular sheet, and may be made of a ceramic material such as MICA.

The double-sided adhesive film 120 may have adhesive properties on both surfaces thereof, that is, one surface and the other surface thereof so as to attach the insulating film 110 to the battery cell C. That is, one surface of the double-sided adhesive film 120 may be attached to the insulating film 110, and the other surface thereof may be attached to the battery cell C. The double-sided adhesive film 120 is limitedly attached to a part of the insulating film 110, and may not be attached over most of the region of the insulating film 110. That is, the attachment area between the insulating film 110 and the double-sided adhesive film 120 may be at least smaller than the total area of the insulating film 110.

The double-sided adhesive film 120 may be formed in an area sufficient to provide adhesion between the insulating film 110 and the battery cell C. When the double-sided adhesive film 120 is formed in an excessive area, the insulating film 110 may be wrinkled or crumpled, and thus the attachment area of the double-sided adhesive film 120 is preferably limited to an appropriate level.

If the double-sided adhesive film 120 is excessively attached over most of the region of the insulating film 110, the insulating film 110 may be wrinkled or crumpled, and thus a work for attaching the insulating adhesive tape 100 may be difficult. For example, with respect to the formation of the insulating adhesive tape 100, the insulating adhesive tape 100 is formed by attaching the double-sided adhesive film 120 onto the flat insulating film 110, and the insulating adhesive tape 100 formed in this way may be delivered by being wound in the form of a roll. Then, the insulating adhesive tape 100 delivered in the form of a roll may be transported in one direction with transition from a state of being wound around an unroller, to a state of being flattened again, cut individually to a predetermined size, and then attached between the battery cells C. As such, the insulating adhesive tape 100 repeats bending in the form of a roll and flattening, and in the attachment area between the insulating film 110 and the double-sided adhesive film 120 that are stickily attached to each other, stress may be accumulated to such an extent that movement therebetween is limited. In this case, when the attachment area of the double-sided adhesive film 120 is formed in an excessive area exceeding an appropriate level, the double-sided adhesive film 120 restricts the movement of the insulating film 110 and the causes the crumples or wrinkles of the insulating film 110.

In an embodiment of the present disclosure, the double-sided adhesive film 120 may be formed in a stripe pattern extending along one direction crossing the insulating film 110, and may include a pair of double-sided adhesive films 120 extending in parallel with each other. More specifically, the double-sided adhesive film 120 may be formed in a stripe pattern along the height direction Z2 of the battery cell C, and may be formed as a pair so as to be spaced apart from each other along the width direction Z3 of the battery cell C. In this embodiment, the length direction Z2 of the double-sided adhesive film 120 may correspond to the height direction Z2 of the battery cell C, and the width direction Z3 of the double-sided adhesive film 120 may correspond to the width direction Z3 of the battery cell C. Throughout the present specification, the height direction Z2 of the battery cell C may refer to a direction facing an electrode surface of the battery cell C in which the first and second electrode terminals 11 and 12 are formed, and the width direction Z3 of the battery cell C may refer to a direction in which the first and second electrode terminals 11 and 12 face each other. The height direction Z2 of the battery cell C and the width direction Z3 of the battery cell C may correspond to directions perpendicular to each other.

The double-sided adhesive film 120 may be formed in pairs spaced apart from each other along the width direction Z3 of the battery cell C, thereby providing a balanced adhesion between the battery cell C and the insulating film 110. In this case, the double-sided adhesive films 120 may be respectively formed on the front and back surfaces of the insulating film 110 along the arrangement direction Z1 of the battery cells C, so that the front battery cell (C) and the rear battery cell (C) may be attached to each other, and the battery cells C adjacent to each other in the front and rear directions may be firmly attached to each other through the double-sided adhesive films 120 formed in pairs at balanced positions along the width direction Z3 of the battery cells C. Throughout the present specification, the front-rear direction may refer to an arrangement direction Z1 in which the battery cells C are arranged.

The double-sided adhesive films 120 are formed in pairs spaced apart from each other along the width direction Z3 of the battery cell C, thereby providing an extra space capable of absorbing the volume expansion of swelling concentrated in the central region of the battery cell C. Meanwhile, in another embodiment of the present disclosure, the double-sided adhesive films 120 may be formed in a stripe pattern along the width direction Z3 of the battery cell C, and may also be formed in a pair so as to be spaced apart from each other along the height direction Z2 of the battery cell C. In this embodiment, the length direction Z3 of the double-sided adhesive film 120 may correspond to the width direction Z3 of the battery cell C, and the width direction Z2 of the double-sided adhesive film 120 may correspond to the height direction Z2 of the battery cell C.

Cut lines 121 may be formed in the double-sided adhesive film 120. The cut lines 121 may allow relative deformation or positional movement between the double-sided adhesive film 120 and the insulating film 110, thereby relieving the stress between the double-sided adhesive film 120 and the insulating film 110 and thus preventing the crumples or wrinkles of the insulating film 110.

As described above, with respect to the formation of the insulating adhesive tape 100, the insulating adhesive tape 100 is formed by attaching the double-sided adhesive film 120 onto the flat insulating film 110, and the insulating adhesive tape 100 formed in this way may be delivered by being wound in the form of a roll. Then, the insulating adhesive tape 100 delivered in the form of a roll may be transported in one direction with transition from a state of being wound around an unroller, to a state of being flattened again, cut individually to a predetermined size, and then attached between the battery cells C. In this case, the double-sided adhesive film 120 attached to the flat insulating film 110 may cause the crumples or wrinkles of the insulating film 110 while being wound in a roll form, and in contrast, the double-sided adhesive film 120 may cause the crumples or wrinkles of the insulating film 110 while the insulating adhesive tape 100 wound around an unroller in a roll form spreading out again in a flat state. That is, the insulating adhesive tape 100 repeats bending in the form of a roll and flattening, and in this case, as the movement between the insulating film 110 and the double-sided adhesive film 120, which are attached to each other in a sticky manner, is restricted, stress may accumulate between the insulating film 110 and the double-sided adhesive film 120, and the accumulation of stress may cause the crumple or wrinkle of the insulating film 110.

In the present disclosure, since the cut lines 121 are formed in the double-sided adhesive film 120, relative deformation or positional movement between the double-sided adhesive film 120 and the insulating film 110 may be allowed, thereby relieving the stress between the double-sided adhesive film 120 and the insulating film 110 and thus preventing the crumples or wrinkles of the insulating film 110 due to the accumulation of stress.

Referring to FIG. 5, the cut line 121 may be limitedly formed only to a cut thickness Tc corresponding to a part of the total thickness T of the double-sided adhesive film 120, and may not be formed to the remaining thickness Tr. That is, the remaining thickness Tr may include an intact double-sided adhesive film 120 in which the cut line 121 is not formed. If the cut line 121 is formed over the entire thickness T of the double-sided adhesive film 120, since the double-sided adhesive film 120 is separated by a unit of the cut line 121, in the process of attaching the double-sided adhesive film 120, it is necessary to individually attach each piece of the double-sided adhesive film 120 separated by the cut line 121 to each piece without performing a continuous work, and there is a concern about the detachment of the torn double-sided adhesive film even after the attachment of the double-sided adhesive film 120, so that the cut line 121 to be formed in the double-sided adhesive film 120 may be limitedly formed only to the cut thickness Tc, which is a part of the total thickness T of the double-sided adhesive film 120, for the efficiency of the attachment operation and the strong attachment of the double-sided adhesive film 120. For example, of the total thickness T of the double-sided adhesive film 120, the remaining thickness Tr of the double-sided adhesive film 120 having an intact form, to which the cut line 121 is not formed and the double-sided adhesive film 120 is not cut, may be formed to be 0.1 mm or more. If the residual thickness Tr of the double-sided adhesive film 120 is formed to be less than 0.1 mm, the double-sided adhesive film 120 may be separated by a unit of the cut line 121 even with a small shock or vibration.

Meanwhile, the cut line 121 of the double-sided adhesive film 120 is for relieving the stress between the double-sided adhesive film 120 and the insulating film 110 by allowing the relative deformation or positional movement between the double-sided adhesive film 120 and the insulating film 110, it is preferred that the cut thickness Tc of the cut line is formed to a sufficient thickness. When the cut thickness Tc of the cut line 121 is formed too thin, it may not be sufficient to relieve the stress between the double-sided adhesive film 120 and the insulating film 110 and it may be difficult to prevent the insulating film 110 from being wrinkled.

Figure 6:
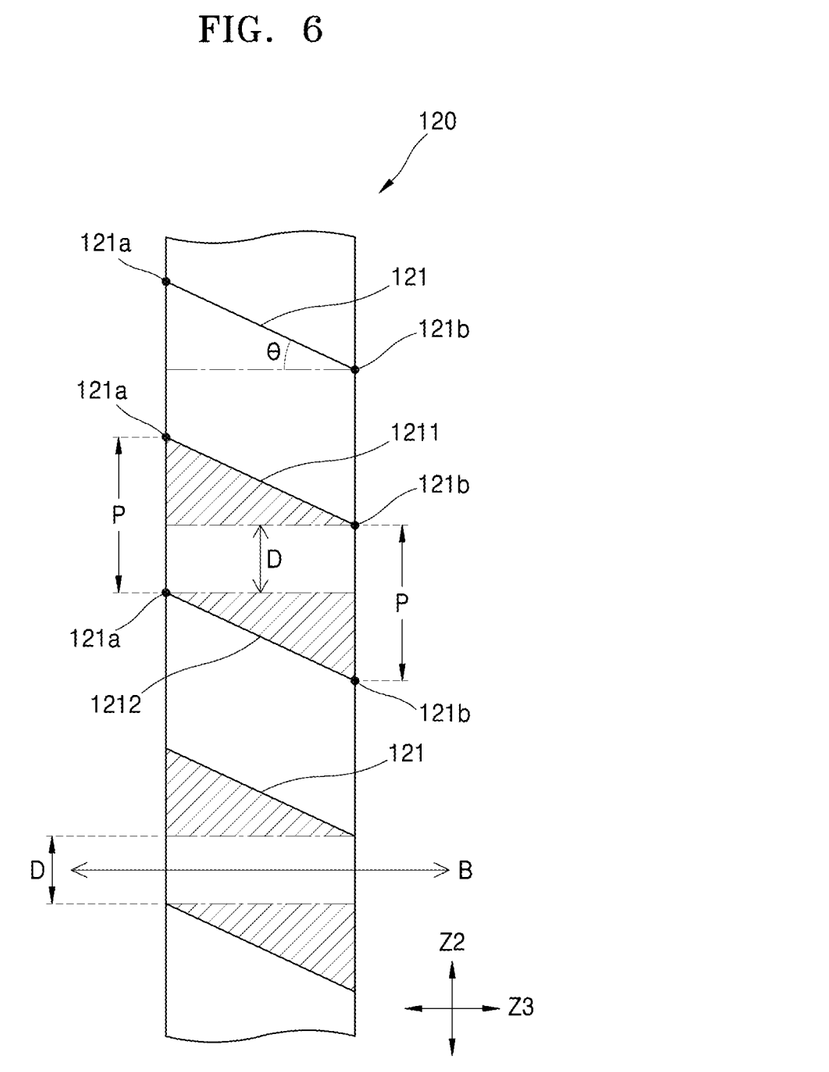
FIG. 6 shows a view for explaining a structure of a cut line of a double-sided adhesive film.

FIG. 6 shows a view for explaining a structure of a cut line of a double-sided adhesive film.

Referring to FIG. 6, a plurality of cut lines 121 may be formed with a pitch interval P therebetween in the length direction Z2 of the double-sided adhesive film 120. For example, the cut lines 121 may be formed at a constant pitch interval P along the length direction Z2 of the double-sided adhesive film 120. The cut line 121 may include first and second ends 121a and 121b opposite to each other along the width direction Z3 of the double-sided adhesive film 120, and the pitch interval P may correspond to a distance between the same first ends 121a of the first and second cut lines 1211 and 1212 adjacent to each other or a distance between the same second ends 121b of the first and second cut lines 1211 and 1212 adjacent to each other. Throughout the present specification, the width direction Z3 of the double-sided adhesive film 120 may refer to a direction perpendicular to the length direction Z2 of the double-sided adhesive film 120. For example, in an embodiment of the present disclosure, the length direction Z2 and the width direction Z3 of the double-sided adhesive film 120 may correspond to the height direction Z2 and the width direction Z3 of the battery cell C, respectively.

With respect to the setting of the pitch interval P, it is preferred that the first cut line 1211 and the second cut line 1212 adjacent to each other along the longitudinal direction Z2 of the double-sided adhesive film 120 are spaced apart from each other with a sufficient pitch interval P so as not to overlap each other along the width direction Z3 of the double-sided adhesive film 120. For example, it is preferred that the first and second cut lines 1211 and 1212 are spaced apart from each other with a sufficient pitch interval P therebetween such that the projections (hatched regions in FIG. 6) of the first and second cut lines 1211 and 1212 do not overlap each other along the width direction Z3 of the double-sided adhesive film 120. In an embodiment of the present disclosure, the pitch interval P may be set within the range of 20 mm to 30 mm. It is preferred that the pitch interval P between the cut lines 121 adjacent to each other is set in relation to the shortest distance D between the cut lines 121 adjacent to each other, which will be described later.

It is preferred that the shortest distance D between the first and second cut lines 1211 and 1212 adjacent to each other along the length direction Z2 of the double-sided adhesive film 120 (or the shortest distance D between the neighboring cut lines 121) is formed to have a value greater than at least 0 (zero). The first and second cut lines 1211 and 1212 may extend obliquely at a constant inclination angle θ along the width direction Z3 of the double-sided adhesive film 120. In this case, the shortest distance D between the first and second cut lines 1211 and 1212 along the length direction Z2 of the double-sided adhesive film 120 (or the shortest distance D between neighboring cut lines 121) may correspond to a distance between the first and second ends 121a and 121b opposite to each other along the width direction Z3 among the first and second cut lines 1211 and 1212.

More specifically, the shortest distance D between the first and second cut lines 1211 and 1212 (or the shortest distance D between neighboring cut lines 121) may correspond to a distance from the second end 121b of the first cut line 1211 to the first end 121a of the second cut line 1212 along the length direction Z2 of the double-sided adhesive film 120. Here, the second end 121b of the first cut line 1211 and the first end 121a of the second cut line 1212 are ends adjacent to each other along the length direction Z2 of the double-sided adhesive film 120, and the distance therebetween may correspond to the shortest distance D between the first and second cut lines 1211 and 1212. Contrary, the first end 121a of the first cut line 1211 and the second end 121b of the second cut line 1212 are ends arranged away from each other in the length direction Z2 of the double-sided adhesive film 120, and the distance therebetween may correspond to the longest distance between the first and second cut lines 1211 and 1212, but does not correspond to the shortest distance D.

As described above, unlike the shortest distance D between the first and second cut lines 1211 and 1212 adjacent to each other, the pitch interval P of the first and second cut lines 1211 and 1212 (or the pitch interval P of the cut line 121) may correspond to a distance between the same first ends 121*a* or second ends 121*b* of the first and second cut lines 1211 and 1212 along the width direction Z3.

In order to separate the continuously formed insulating adhesive tape 100 (or double-sided adhesive film 120) individually, the shortest distance D between the first and second cut lines 1211 and 1212 may form an clearance width of a cutting path B through which a cutting blade passes in the width direction Z3 of the double-sided adhesive film 120. That is, the insulating adhesive tape 100 (or the double-sided adhesive film 120) may be individually cut to an appropriate size along the length direction Z2 and attached to the battery cell C. In this case, if the cutting path B and the cut line 121 are in contact with each other, some pieces of the double-sided adhesive film 120 are detached from the double-sided adhesive film 120 while the cutting path B and the cut-out line 121 are in contact with each other, so that an adhesion gap may occur. Accordingly, in the present disclosure, it is preferable to sufficiently secure the clearance width, that is, the shortest distance (D) between the first and second cut lines 1211 and 1212, such that the cutting path B and the cut line 121 do not come into contact with each other.

Referring to FIG. 6, in an embodiment of the present disclosure, the shortest distance D between the first and second cut lines 1211 and 1212 (or the shortest distance D between neighboring cut lines 121) may correspond to an extra length remaining by excluding the projections (hatched areas in FIG. 6) of the first and second cut lines 1211 and 1212 from the pitch interval P of the first and second cut lines 1211 and 1212 (or the pitch interval of the cut line 121). If the cutting path B of the cutting blade passing in the width direction Z3 is formed inside the projection (hatched area in FIG. 6) of the first and second cut lines 1211 and 1212 in order to cut the insulating adhesive tape 100 or the double-sided adhesive film 120 individually, the double-sided adhesive film 120 is fragmented as the cutting path B and the first and second cut lines 1211 and 1212 come into contact with each other. Therefore, it is preferred that the cutting pass B passes through the extra length remaining by excluding the projections (hatched areas in FIG. 6) of the first and second cut lines 1211 and 1212 from the pitch interval P of the first and second cut lines 1211 and 1212 (or the pitch interval of the cut line 121) or passes through the shortest distance D between the second cut lines 1211 and 1212.

In an embodiment of the present invention, the shortest distance D between the first and second cut lines 1211 and 1212, that is, the clearance width of the cutting path B may be set to about half of the pitch interval P of the first and second cut lines 1211 and 1212. As described above, as the shortest distance D between the first and second cut lines 1211 and 1212 set to about half the pitch interval P of the first and second cut lines 1211 and 1212, the cutting pass B may have a process margin to some degree, and even if there are some errors along the length direction Z2 of the double-sided adhesive film 120, it might be prevented adhesion gap of pieces of the double-sided adhesive film 120 being detached, in which the cutting blade crosses the projections (the hatched area in FIG. 6) of the first and second cut lines 1211 and 1212 and comes into contact with the first and second cut lines 1211 and 1212.

More specifically, the pitch interval P of the cut line 121 may be formed to be about 20 mm to 30 mm, and the shortest distance D between the first and second cut lines 1211 and 1212 adjacent to each other (or the clearance width of the cutting path B) may be formed to be about 10 mm to 15 mm, which is a half of the pitch interval P of the cut line 121. In an embodiment of the present disclosure, the pitch interval P of the cut line 121 may be formed to be 25 mm, and the shortest distance D between the first and second cut lines 1211 and 1212 adjacent to each other (or the clearance width of the cutting path B) may be formed to be 12.5 mm, which is a half of the pitch interval P of the cut line 121.

As such, since the pitch interval P of the cut line 121 determines the shortest distance D between the first and second cut lines 1211 and 1212 adjacent to each other (or the clearance width of the cutting path B), if the pitch interval P of the cut line 121 is formed to be smaller than the lower limit value (20 mm), as the cut line 121 and the cutting path B come into contact with each other, the double-sided adhesive film 120 is torn apart and detached to form an adhesion gap. In addition, when the pitch interval P of the cut line 121 is formed to be larger than the upper limit value (30 mm), that is, when the cut line 121 is sparsely formed along the length direction Z2 of the double-sided adhesive film 120, since the relative deformation or positional movement between the double-sided adhesive film 120 and the insulating film 110 may be allowed by the cut line 121, and thus it becomes difficult to achieve the purpose of relieving the stress therebetween and removing the crumples or wrinkles of the insulating film 110.

In an embodiment of the present disclosure, the shortest distance D between the first and second cut lines 1211 and 1212 adjacent to each other (or the clearance width of the cutting path B) may be set in relation to the thickness of the cutting blade (not shown). For example, the shortest distance D between the first and second cut lines 1211 and 1212 adjacent to each other (or the clearance width of the cutting path B) may be formed to be about 1 to 3 times of the thickness of the cutting blade (not shown), and preferably about 2 times of the thickness of the cutting blade (not shown). If the shortest distance D between the first and second cut lines 1211 and 1212 adjacent to each other (or the clearance width of the cutting path B) is formed to be smaller than 1 time of the thickness of the cutting blade (not shown), as the cut line 121 and the cutting path B come into contact with each other, the double-sided adhesive film 120 may be torn apart and thus an adhesive gap may be formed. In addition, when the shortest distance D between the first and second cut lines 1211 and 1212 adjacent to each other (or the clearance width of the cutting path B) is formed to be larger than 3 times of the thickness of the cutting blade (not shown), consequently, the pitch interval P of the cut line 121 is formed widely, considering that the relative deformation or positional movement between the double-sided adhesive film 120 and the insulating film 110 may be allowed by the cut line 121, it becomes difficult to achieve the purpose of relieving the stress therebetween and removing the crumples or wrinkles of the insulating film 110.

Referring to FIG. 6, a plurality of cut lines 121 may be formed along the length direction Z2 of the double-sided adhesive film 120, and in this case, it is preferred that the plurality of cut lines 121 are arranged in parallel at a constant inclination angle θ. If the plurality of cut lines 121 are formed at different inclination angles, it may be difficult to secure a clearance width of the cutting path B through which the cutting blade passes in the process of individually cutting the continuously formed insulating adhesive tape 100 or double-sided adhesive film 120. That is, when the first and second cut lines 1211 and 1212 adjacent to each other extend at different angles, the shortest distance D therebetween may be narrower, compared to when the first and second cut lines 1211 and 1212 adjacent to each other extend in parallel to each other.

Figure 7:
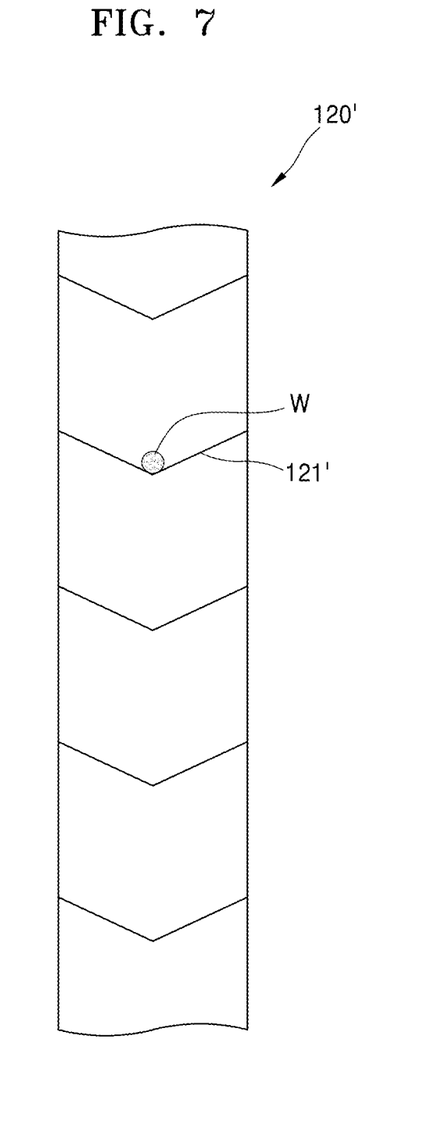
FIG. 7 is a view showing a modified embodiment of the double-sided adhesive film shown in FIG. 6.

In an embodiment of the present disclosure, the cut line 121 may be formed in a straight line extending obliquely along a diagonal direction inclined at a constant inclination angle θ with respect to the width direction Z3 of the double-sided adhesive film 120. In another embodiment of the present invention, the cut line 121 may be modified into various shapes. For example, as may be seen in the double-sided adhesive film 120' shown in FIG. 7, the cut line 121' may be formed in a V-shape or an inverted V-shape in which two straight lines extending at different angles contact each other instead of on a straight line extending obliquely in an oblique direction. However, as shown in FIG. 6, a cut line 121 on a straight line extending obliquely along an oblique direction may be preferred in that in the V-shape or inverted V-shape of the cut line 121', it is possible to form valleys in which foreign substances W such as moisture are accumulated.

Although the present invention has been described with reference to the embodiments shown in the accompanying drawings, this is merely exemplary, it will be understood that those skilled in the art to which the present disclosure belongs can make various modifications and equivalent other embodiments therefrom.

INDUSTRIAL APPLICABILITY

The present disclosure may be applied to a battery pack as an energy source capable of charging and discharging, and may also be applied to various appliances using the battery pack as a driving power source.

The invention claimed is:

1. A battery pack, comprising:
a plurality of battery cells; and
an insulating adhesive tape interposed between the battery cells adjacent to each other,
wherein the insulating adhesive tape includes:
an insulating film; and
at least one double-sided adhesive film attached between the insulating film and the battery cells and extending along one direction, and
wherein a plurality of cut lines are formed in the at least one double-sided adhesive film, the plurality of cut lines extending obliquely with respect to an edge of the at least one double-sided adhesive film.

2. The battery pack of claim 1, wherein the cut lines are formed on a straight line, each of the cut lines extending obliquely along an oblique direction with respect to a width direction of the at least one double-sided adhesive film.

3. The battery pack of claim 1, wherein the cut lines extend at a constant inclination angle with respect to a width direction of the at least one double-sided adhesive film.

4. The battery pack of claim 1, wherein the cut lines are formed at a regular pitch interval along a length direction of the at least one double-sided adhesive film.

5. The battery pack of claim 4, wherein the regular pitch interval is set in a range of 20 mm to 30 mm.

6. The battery pack of claim 1, wherein a shortest distance between the cut lines adjacent to each other in a length direction of the at least one double-sided adhesive film has a value greater than at least 0.

7. The battery pack of claim 6, wherein the shortest distance between the cut lines adjacent to each other is set in a range of 10 mm to 15 mm.

8. The battery pack of claim 6, wherein
each of the cut lines includes first and second ends opposite to each other along a width direction of the at least one double-sided adhesive film, and
the shortest distance between the cut lines adjacent to each other corresponds to a distance between the first and second ends opposite to each other.

9. The battery pack of claim 6, wherein
the cut lines are formed at a regular pitch interval along the length direction of the at least one double-sided adhesive film, and
the shortest distance between the cut lines adjacent to each other is formed to be a half of the regular pitch interval.

10. The battery pack of claim 9, wherein
each of the cut lines includes first and second ends opposite to each other along a width direction of the at least one double-sided adhesive film, and
the regular pitch interval corresponds to a distance between the same first ends or second ends of the cut lines adjacent to each other.

11. The battery pack of claim 1, wherein each of the cut lines extends only partially into the at least one double-sided adhesive film, such that a thickness of each of the cut lines is smaller than a total thickness of the at least one double-sided adhesive film.

12. The battery pack of claim 1, wherein:
the at least one double-sided adhesive film is attached to a first surface of the insulating film, and
an attachment area of the at least one double-sided adhesive film attached to the first surface of the insulating film is smaller than an area of the first surface of the insulating film.

13. The battery pack of claim 1, wherein the at least one double-sided adhesive film is formed in a stripe pattern extending along one direction crossing the insulating film.

14. The battery pack of claim 1, wherein the at least one double-sided adhesive film extends along a height direction of the battery cells.

15. The battery pack of claim 1, wherein the at least one double-sided adhesive film includes a pair of double-sided adhesive films spaced apart from each other along a width direction of a corresponding one of the battery cells, the pair of double-sided adhesive films being attached to a same surface of the insulating film.

16. The battery pack of claim 1, wherein along an arrangement direction of the battery cells, the at least one double-sided adhesive film is attached to front and back surfaces of the insulating film, respectively.

17. The battery pack of claim 1, wherein the at least one double-sided adhesive film covers only a portion of a first surface of the insulating film, an area of the first surface of the insulating film covered by the at least one double-sided adhesive film being smaller than a remaining uncovered area of the first surface of the insulating film.

18. The battery pack of claim 1, wherein the at least one double-sided adhesive film has a stripe pattern, the cut lines being parallel to each other and spaced apart from each other along a longitudinal direction of the stripe pattern.

* * * * *